(12) United States Patent
Carvalho

(10) Patent No.: US 9,251,232 B2
(45) Date of Patent: Feb. 2, 2016

(54) DATABASE CONTROLLER, METHOD, AND SYSTEM FOR STORING ENCODED TRIPLES

(71) Applicant: FUJITSU LIMITED, Kawasaki (JP)

(72) Inventor: Nuno Carvalho, London (GB)

(73) Assignee: FUJITSU LIMITED, Kawasaki (JP)

( * ) Notice: Subject to any disclaimer, the term of this patent is extended or adjusted under 35 U.S.C. 154(b) by 229 days.

(21) Appl. No.: 13/898,915

(22) Filed: May 21, 2013

(65) Prior Publication Data

US 2014/0067762 A1 Mar. 6, 2014

(30) Foreign Application Priority Data

May 24, 2012 (EM) .................. 12169354.3

(51) Int. Cl.
*G06F 7/00* (2006.01)
*G06F 17/30* (2006.01)

(52) U.S. Cl.
CPC ................. *G06F 17/30575* (2013.01)

(58) Field of Classification Search
None
See application file for complete search history.

(56) References Cited

U.S. PATENT DOCUMENTS

| | | | | |
|---|---|---|---|---|
| 7,831,604 B2 * | 11/2010 | Britton | ............ | G06F 17/30893 707/755 |
| 7,908,520 B2 * | 3/2011 | Avizienis | ............ | G06F 11/2028 714/30 |
| 8,078,646 B2 * | 12/2011 | Das | ............ | G06F 17/30917 707/693 |
| 8,078,647 B2 * | 12/2011 | Liang | ............ | G06F 17/30569 707/802 |
| 8,209,577 B2 * | 6/2012 | Huang | ............ | H03M 13/033 714/6.2 |
| 8,346,812 B2 * | 1/2013 | Chappell | ............ | G06F 17/30911 707/695 |
| 8,433,685 B2 * | 4/2013 | Hayden | ............ | G06F 17/30088 707/640 |
| 8,447,786 B2 * | 5/2013 | Akolkar | ............ | G06F 17/30958 707/798 |
| 8,478,766 B1 * | 7/2013 | Tsypliaev | ......... | G06F 17/30566 705/7.11 |
| 8,522,125 B1 * | 8/2013 | Feng | ............ | H03M 13/293 714/801 |
| 8,595,606 B1 * | 11/2013 | Feng | ............ | H03M 13/2909 714/800 |
| 8,756,246 B2 * | 6/2014 | Wu | ............ | G06F 17/30864 707/769 |
| 8,793,273 B1 * | 7/2014 | Sadovsky | ............ | G06F 8/427 707/769 |
| 2008/0243770 A1 | 10/2008 | Aasman | | |
| 2010/0030725 A1 * | 2/2010 | Mendis | ............ | G06F 21/6227 707/781 |
| 2011/0022629 A1 * | 1/2011 | Glover | ............ | G06F 17/3089 707/769 |
| 2011/0125696 A1 | 5/2011 | Wu et al. | | |
| 2011/0320431 A1 * | 12/2011 | Jackson | ............ | G06F 17/30448 707/713 |

(Continued)

FOREIGN PATENT DOCUMENTS

| | | | | |
|---|---|---|---|---|
| JP | 2631819 A1 * | 8/2013 | ........ | G06F 17/30958 |
| JP | 2013246828 A * | 12/2013 | | |

(Continued)

OTHER PUBLICATIONS

Min Cai, "RDFPeers: A Scalable Distributed RDF Repository based on a Structured Peer-to-Peer Network", 2003, pp. 1-8.*

Tushar Deepak Chandra et al., "Unreliable Failure Detectors for Reliable Distributed Systems," *Journal of the ACM*, vol. 43, No. 2 (Mar. 1996) pp. 225-267.

(Continued)

*Primary Examiner* — Hexing Liu

(74) *Attorney, Agent, or Firm* — Staas & Halsey

(57) ABSTRACT

A database controller controls a database for storing graph data encoded as triples, each triple having a subject, a predicate, and an object, and each stored within a data item among a set of data items ordered according to the triple stored within. Each data item is stored on a storage node from among a plurality of storage nodes distributed in a network. The database controller includes a storage request receiver configured to receive a request to store a triple in the database, and a data item generation module configured to generate two or more data items each having a different version of the triple.

10 Claims, 3 Drawing Sheets

(56) References Cited

U.S. PATENT DOCUMENTS

2012/0310916 A1* 12/2012 Abadi ............... G06F 17/30445
 707/713
2014/0310302 A1* 10/2014 Wu ................... G06F 17/30442
 707/769

FOREIGN PATENT DOCUMENTS

| KR | 20130111047 | A | * | 10/2013 |
| KR | 101380605 | B1 | * | 4/2014 |
| WO | WO 2008/001281 | A2 | | 1/2008 |

OTHER PUBLICATIONS

Min Cai et al., "RDFPeers: A Scalable Distributed RDF Repository based on a Structured Peer-to-Peer Network," *WWW2004* (May 17-22, 2004) pp. 650-657.

D. Dominguez-Sal et al., "Survey of Graph Database Performance on the HPC Scalable Graph Analysis Benchmark," Web-Age Information Management—WAIM 2010 Workshops, LNCS 6185 (2010) pp. 37-48.

Extended European Search Report mailed Oct. 1, 2012 in corresponding Published Application No. 12156707.7.

* cited by examiner

DATABASE CONTROLLER, METHOD, AND SYSTEM FOR STORING ENCODED TRIPLES

CROSS REFERENCE TO RELATED APPLICATIONS

This application claims the benefit of European Application No. 12169354.3, filed May 24, 2012, the disclosure of which is incorporated herein by reference.

BACKGROUND OF THE INVENTION

The present invention is in the field of data storage. In particular, the embodiments of the present invention relate to the storage of triples describing graph data within a distributed storage environment.

Relational databases store data in rows and columns. The rows and columns compose tables that need to be defined before storing the data. The definition of the tables and the relationship between data contained on these tables is called a schema. A relational database uses a fixed schema. Graph databases represent a significant extension over relational databases by storing data in the form of nodes and arcs, where a node represents an entity or instance, and an arc represents a relationship of some type between any two nodes. In an undirected graph, an arc from node A to node B is considered to be the same as an arc from node B to node A. In a directed graph, the two directions are treated as distinct arcs.

Graph databases are used in a wide variety of different applications that can be generally categorized into two major types. The first type consists of complex knowledge-based systems that have large collections of class descriptions (referred to as "knowledge-based applications"), such as intelligent decision support and self learning. The second type includes applications that involve performing graph searches over transactional data (referred to as "transactional data applications"), such as social data and business intelligence. Many applications may represent both types. However, most applications can be characterized primarily as either knowledge-based or transactional data applications. Graph databases can be used to maintain large "semantic networks" that can store large amounts of structured and unstructured data in various fields. A semantic network is used as a form of knowledge representation and is a directed graph consisting of nodes that represent concepts, and arcs that represent semantic relationships between the concepts.

There are several types of graph representations. Graph data may be stored in memory as multidimensional arrays, or as symbols linked to other symbols. Another form of graph representation is the use of "tuples," which are finite sequences or ordered lists of objects, each of a specified type. A tuple containing n objects is known as an "n-tuple," where n can be any non-negative integer greater than zero. A tuple of length 2 (a 2-tuple) is commonly called a pair, a 3-tuple is called a triple, a four-tuple is called a quadruple, and so on.

The Resource Description Framework (RDF) is a general method for conceptual description or modeling of information that is a standard for semantic networks. The amount of RDF data that is available nowadays is growing and it is already impossible to store it in a single server. In order to be able to store and search large amounts of data, the data must be maintained in multiple servers. Adding, deleting and querying data must be done in a coordinated way, using algorithms and data structures specially tailored for distributed systems. It is desirable to store graph data in a way which enables computationally efficient querying, maintenance, and manipulation of the data.

As with all computing hardware, there is always some risk that a storage node (such a server) on which data is stored will fail. Thus, it is known in the art to provide "redundant" storage nodes storing copies of data in case of failure of a storage node. However, providing such a redundant storage node can be costly in terms of infrastructure provision, maintenance, and running costs. As reliability of storage nodes increases, the provision of redundant storage nodes purely to enable data recovery in case of failure of another node is of decreasing value in terms of costs per utilisation.

SUMMARY OF THE INVENTION

Embodiments of the present invention provide a database controller for a database for storing graph data encoded as triples, each triple comprising a subject, a predicate, and an object, and each stored within a data item among a set of data items ordered according to the triple stored within, with each data item being stored on a storage node from among a plurality of storage nodes distributed in a network; the database controller comprising: a storage request receiver configured to receive a request to store a triple in the database; a data item generation module configured to generate two or more data items each having a different version of the triple from among the following:
  a first version in which the subject precedes the predicate and the object in the data item;
  a second version in which the predicate precedes the subject and the object in the data item; and
  a third version in which the object precedes the subject and the predicate in the data item.

The database controller further comprises: an instruction distributer configured to, for each of the two or more data items, select a storage node from among the plurality of storage nodes to instruct to store the data item, the selection being made in dependence upon the position of the data item within the ordered set, the instruction distributer including a redundancy module configured to ensure that at least two different storage nodes from among the plurality of storage nodes are instructed to store a data item including a version of the triple.

Advantageously, embodiments of the present invention provide for a fault tolerant distributed storage system with ordering to store and query graph data stored as triples. Embodiments provide or implement a technique to store data that allows for high efficiency in both the execution of range queries on the stored data, and in the recovery of stored data in the case of failure of a storage node.

To execute efficient range queries, triples are stored in at least two (for example, three) different orders, for example, two (or three) from SPO, POS, and OSP (wherein throughout this document P may be employed to represent the predicate, S to represent the subject, and O to represent the object). It is the variation of the leading element in two or more versions of the same triple that is of primary importance, with the variation in positions of the remaining two elements being desirable though not essential. The redundancy module, or equivalent functionality, ensures that the at least two different versions of the triple that are provided for the purposes of efficient range queries can also serve as replicas for providing fault tolerance in case of storage node failures.

In summary, embodiments of the present invention provide for a database which stores graph data as encoded triples replicated in two or more versions each having a different element of the triple as the leading element (in the form in which it is stored) in order to provide for efficient range querying, but which also uses those replicated versions to provide data redundancy for regeneration of lost data.

In embodiments of the present invention, each triple (such as an RDF triple) is stored as or as part of a data item, for example, as a simple string object, and is unique in the graph, G. So all the information about G is kept in the data items. The triples are stored as (encoded in) data items in an ordered data set that is distributed through processes in network storage nodes in a distributed network environment (such as a peer-to-peer network environment). A process running on each storage node facilitates the storage of an ordered subset of the data items. The process and the network storage node running the process are referred to more or less interchangeably in this document, it being clear from the context when the former or the latter is exclusively intended. Embodiments of the present invention enable efficient querying procedures to be run on the data. For example, a procedure to retrieve a range of data items, between dmin and dmax (when placed in order), executes the following steps:

A client application sends a request to one of the processes, A;
A executes a mapping function, getting the storage node IDs (or labels) of the processes that contain one subset of the required data range (in an exemplary case the data items are evenly distributed and each process is responsible for storing a large number of data items). As an example, consider that the data items required by the client application are stored in processes A and B;
A broadcasts a sub-range request to retrieve each subset of the required data items, to itself, and to B;
Each process replies to A with the requested data items;
A gathers the results (maintaining their order) and replies to the client application.

It can be seen from the above example that embodiments of the present invention enable more efficient querying of data. Furthermore, steps do not need to be repeated per data item in the request, as is the case with conventional technology.

Graph data in embodiments of the present invention may be directional graph data, so that an arc from a first graph node to a second graph node is not considered to be the same as an arc from the second graph node to the first graph node. A semantic network is formed as a representation of knowledge or information, with graph nodes representing concepts such as an entity or an instance, and arcs representing semantic relationships between the concepts.

In embodiments of the present invention, graph data is encoded as a triple, which is a finite sequence or ordered list of three objects, each of a specified type.

Optionally, the triples may be Resource Description Framework (RDF) triples. Throughout this document, it should be understood that where specific references to "RDF triple(s)" are made, it is an exemplary form of triple, conforming to the RDF standard. Furthermore, references to "triple(s)" include the possibility that the triple in question is an RDF triple. Similarly, the RDF processors discussed elsewhere in this document are exemplary of processors used for interaction between the API wrapper and the stored data items.

The Resource Description Framework is a general method for conceptual description or modeling of information that is a standard for semantic networks. Standardising the modeling of information in a semantic network allows for interoperability between applications operating on a common semantic network. RDF maintains a vocabulary with unambiguous formal semantics, by providing the RDF Schema (RDFS) as a language for describing vocabularies in RDF.

Optionally, each of one or more of the elements of the triple (an element being the predicate, the object, or the subject) is a Uniform Resource Identifier (URI). RDF and other triple formats are premised on the notion of identifying things (i.e. objects, resources or instances) using Web identifiers such as URIs and describing those identified 'things' in terms of simple properties and property values. In terms of the triple, the subject may be a URI identifying a web resource describing an entity, the predicate may be a URI identifying a type of property (for example, colour), and the object may be a URI specifying the particular instance of that type of property that is attributed to the entity in question, in its web resource incarnation. The use of URIs enables triples to represent simple statements, concerning resources, as a graph of nodes and arcs representing the resources, as well as their respective properties and values. An RDF graph can be queried using the SPARQL Protocol and RDF Query Language (SPARQL). It was standardized by the RDF Data Access Working Group (DAWG) of the World Wide Web Consortium, and is considered a key semantic web technology. SPARQL allows for a query to consist of triple patterns, conjunctions, disjunctions, and optional patterns.

The triples provide for encoding of graph data by characterising the graph data as a plurality of subject-predicate-object expressions. In that context, the subject and object are graph nodes of the graph data, and as such are entities, objects, instances, or concepts, and the predicate is a representation of a relationship between the subject and the object. The predicate asserts something about the subject by providing a specified type of link to the object. For example, the subject may denote a Web resource (for example, via a URI), the predicate denote a particular trait, characteristic, or aspect of the resource, and the object denote an instance of that trait, characteristic, or aspect. In other words, a collection of triple statements intrinsically represents directional graph data. The RDF standard provides formalised structure for such triples.

The distributed network of storage nodes may include a system of more than one distinct storage units in communication with one another. An exemplary communication paradigm is peer-to-peer (P2P), hence it may be that the distributed network of storage nodes is a peer-to-peer network of storage nodes. P2P is a distributed architecture that partitions tasks or workloads between peers. Peers (individual storage nodes or processes) are equally privileged, equipotent participants in the application. Each peer is configured to make a portion of its resources, such as processing power, disk storage or network bandwidth, directly available to other network participants, without the need for central coordination by servers or stable hosts. Peers can be considered to be both suppliers and consumers of resources, in contrast to a traditional client-server model where servers supply and clients consume. Advantageously, a P2P system can maintain large groups of storage nodes exchanging messages with a logarithmic communication cost.

In embodiments, for example those in which the object of the triple is complex, it may be that the object stored in the ordered data item is a universal unique ID (UUID) generated for that object. This option may be useful in embodiments used in implementation scenarios in which objects are large and hence their size reduces the efficiency of the range query procedure.

In embodiments of the present invention, the triple is stored in an ordered data item, so that a query which returns a data item enables the representation of the triple to be retrieved.

The storage of different versions of the same triple for the purposes of efficient range querying could also be beneficial for data recovery purposes, if the different versions are stored on more than one different storage node. Therefore, the provision of a redundancy module in embodiments of the present invention obviates the need to replicate each data item in order to provide redundancy of data to enable recovery in the case of storage node failure.

Optionally, the data item generation module is configured to generate three data items each having a different version of the triple from among the first version, the second version, and the third version.

Advantageously, having data items with three different versions of the triple enables for efficient range querying by any of the three elements of the triple. That is to say, a range of subjects, objects, or predicates could be specified, and the data items storing triples included in the range returned in an efficient manner.

It may be that the redundancy module is configured to ensure that the at least two different storage nodes are each instructed to store a data item including a different version of the triple. For example, in embodiments in which there are three or more storage nodes in the plurality of storage nodes, the redundancy module may be configured to ensure that three different storage nodes from among the plurality of storage nodes are each instructed to store a data item including a different version of the triple.

In this particular implementation, the data items storing the three different versions of the triple are themselves distributed over three different storage nodes (one per storage node) in the network.

This is advantageous because the advantages of having three different versions of the triple apply, and in addition, should a storage node storing any of those versions fail, there are two other storage nodes also storing a version of the triple, so that the version stored on the failed storage node can be regenerated in an efficient fashion.

Alternatively, it may be that the redundancy module is configured to ensure that three different storage nodes each store a version of the triple, but not necessarily that they are different versions. For example, should the mapping procedure performed by the instruction distributer result in two different versions of the same triple on one storage node, and another different version on another node, it may be that the redundancy module simply generates a replica of a particular version (for example, SPO) of the triple for storage on a third storage node, regardless of which of the existing versions of the triple are stored on each of said one storage node and said another storage node.

In embodiments of the present invention, data items may be ordered by the lexical order of a string object representing elements of the triple, the string object being the data item, or included in the data item. For example, the lexical order may be alphabetical order. It may be desirable in implementations of invention embodiments to query a set of data items by fixing either the subject, the predicate, or the object (or the UUID of the object) of the data items. In order to efficiently return the results of such queries, it is advantageous for two or more elements of the triple to be stored as the first element in a data item.

The data items being ordered enables comparisons between data items to be made and range queries to be executed. A range query between D1 and D2 (where D1<D2) is a query that returns the data items contained in the ordered set of data items that are greater than D1 and less than D2, according to some pre-defined ordering metric of the data items. Of course, the set of data items is split across the nodes (wherein the nodes are resources such as servers, or processes running on those servers) of a distributed network of nodes. In an exemplary embodiment, a range query is initiated by a processor such as an RDF processor on behalf of an application by sending the query to one of the nodes. The node is configured to calculate which other nodes have data items sought by the query, for example, by applying the logical representation of the data items to D1 and D2, and executing sub-range queries on those nodes. The node is then configured to gather the results (maintaining the order of the data items) and return them to the processor that invoked the query.

In terms of the form in which the triples are stored within the data items, it may be that each of the data items includes a string object comprising the subject, the predicate, and the object of the corresponding triple.

Advantageously, a string object is universally readable and established routines for its comparison and other handling requirements exist. The database itself and applications accessing the database may have well-established routines for handling string objects. Furthermore, string objects are quick to search and compare (order).

In such embodiments, the data items may be ordered according to alphabetical comparisons of the string objects.

Advantageously, databases functions such as searching, ranging, and other comparison functions are available which are optimised in terms of computational efficiency to compare the alphabetical content of string data objects. Hence embodiments ordering data items in this way are particularly efficient in terms of computational efficiency. In such embodiments, it may that the data items are ordered according to the alphabetical order of their string objects. The data items may simply be string objects, or they may include other objects or data. A string is a sequence of alphanumeric symbols.

Optionally, the instruction distributer may be configured to select a storage node from among the plurality of storage nodes to instruct to store the data item by using an ordered hash table. Advantageously, a hash table provides a computationally efficient way of mapping (wherein mapping is equivalent in meaning to selecting a storage node from among the plurality of storage nodes to instruct to store the data item) data items to nodes. An ordered hash table uses a hash function to allocate a data item to a node based on the content of the data item.

In a key value system, a hash table or hash map is a data structure that uses a hash function to map identifying values, known as keys, to their associated values. Thus, a hash table can be said to implement an associative array. The hash function is used to transform the key into the index (the hash) of an array element (the storage location, also referred to as the slot or bucket) where the corresponding value is to be sought.

Optionally, the ordered hash table may use a consistent hashing function.

Consistent hashing regulates the number of ordered data items that need to be remapped in response to a change in the number of storage nodes in which the data items are stored. For example, consider a system where the D data items are distributed among n−1 'peers' in a peer-to-peer system. Should a new peer join the system, only D/n keys need to be remapped. In consistent hashing, when a new peer is added to the system, it takes an approximately equal share of stored data items from the other peers, and when a peer is removed, its data items are shared between the remaining peers.

The technique, whether it be a hashing function or otherwise, used by the instruction distributer to select a storage node to instruct to store a particular data item should be deterministic. That is to say, the selections of storage nodes from among the plurality of storage nodes to instruct to store the data items are deterministic selections. Therefore, the result of the selection can be determined by another database controller in the network, or by the same database controller in a subsequent operation. In embodiments having more than one database controller, the same deterministic selection procedure is used by each database controller, so that given the same input variables, the same result would be generated.

As additional information in the value of a KVS arrangement, or otherwise as data stored in the data item with the triple, in embodiments of the present invention it may be that each of the two or more data items storing a different version of the same triple also include data identifying the storage node on which each of the other data items storing different versions of that triple are stored.

Advantageously, including data identifying the storage node(s) on which each of the other data items storing different versions of the same triple are stored enables data items stored on nodes which have not failed to be used to identify which data items were stored on the failed node, and hence need to be recovered or regenerated.

The storage nodes are identifiable by an ID, and the IDs can be ordered so that the order of the ordered set of data items is maintained when they are distributed among the network of storage nodes and stored. For example, the ID may be obtained by applying a hashing function to the address of the storage node within the network.

The database controller embodying the present invention may further comprise a failure detector configured to detect when a storage node in the distributed network of storage nodes has failed and to identify the triples stored within data items stored on the failed storage node, wherein the database controller is configured to perform the generating at the data item generation module and the selecting at the instruction distributer for each of the identified triples, with the failed storage node being excluded from the plurality of storage nodes from among which the storage nodes are selected, and the instruction distributer is configured to instruct the selected storage nodes to store data items having a version of the identified triple, and to instruct removal of any data items having a version of the identified triple stored by storage nodes prior to the failure which are not now selected.

Advantageously, the failure detector and associated functionality of the database controller provides an efficient data recovery process in the case of storage node failure, whilst minimising the system cost related to storing copies of data purely for data recovery purposes.

Optionally, in a database controller embodying the present invention, the redundancy module may be configured to, following the selection of storage nodes for the two or more data items, obtain a count of the number of different storage nodes from among the storage nodes selected to store the two or more data items, and if the count is less than the number of different storage nodes that the redundancy module is configured to ensure are instructed so store a data item including a version of the triple, then the redundancy module is configured to instruct a number, equal to the difference between the count and the number of different storage nodes that the redundancy module is configured to ensure are instructed to store a data item including a version of the triple, of additional storage nodes from among the plurality of storage nodes to store a data item including a version of the triple.

Such a redundancy module is particularly advantageous when the selection procedure used by the instruction distributer is deterministic, since it enables replicas of the data items to be stored for data recovery purposes without disturbing the deterministic nature of the relationship between data items and the storage nodes on which they are stored. The number of different storage nodes that the redundancy module is configured to ensure are instructed to store a data item including a version of the triple is two or more and is implementation-specific, but in preferable embodiments is three. Hence, the number of different storage nodes instructed to store a data item including a version of the triple is three minus the count. It may that replicas of a data item including a particular version (for example, SPO) of the triple are made and stored on the additional storage nodes.

Furthermore, the data items stored by the additional storage nodes may be stored outside of the ordered set of data items.

Advantageously, this ensures that the order of the ordered set of data items is maintained, and the deterministic nature of the relationship between the data items and the node on which they are stored is also maintained.

In an alternative embodiment, the redundancy module is incorporated into a hashing algorithm used by the instruction distributer to select the storage nodes from among the plurality of storage nodes on which to store the data items.

Embodiments of the present invention also include a computing device, such as a server, configured to function as a database controller embodying the present invention. For example, said computing device may be one of the storage nodes in the distributed network. Furthermore, said computing device may be one amongst a plurality of such computing devices, so that in the distributed network of storage nodes more than one (for example, all) of the plurality of storage nodes have the functionality of a database controller embodying the present invention.

Embodiments of the present invention include a computer program, or a non-transitory storage medium storing a computer program, which when executed by a computing device causes the computing device to function as a database controller embodying the present invention.

The present invention may also be embodied by a method for storing graph data encoded as triples in a database, each triple comprising a subject, a predicate, and an object, and each stored within a data item among a set of data items ordered according to the triple stored within, with each data item being stored on a storage node from among a plurality of storage nodes distributed in a network; the method comprising: receiving a request to store a triple in the database; generating two or more data items each having a different version of the triple from among the following: a first version in which the subject precedes the predicate and the object in the data item; a second version in which the predicate precedes the subject and the object in the data item; and a third version in which the object precedes the subject and the predicate in the data item. Such a method further comprises: for each of the two or more data items, selecting a storage node from among the plurality of storage nodes to instruct to store the data item, the selection being made in dependence upon the position of the data item within the ordered set, and ensuring that at least two different storage nodes from among the plurality of storage nodes are instructed to store a data item including a version of the triple.

The data items discussed in this document may be standalone pieces of information stored as rows or entries in a table. However, invention embodiments include implementations in which each of the data items is a key of a key-value pair within a key-value system (KVS).

Advantageously, storage of keys including a full triple within the key of a key-value system enables functions to be performed on the set of keys that return the full triple, rather than simply a link or identifier to where the triple might be found.

Being stored in the key of a key-value pair includes representing the elements of the triple as a string object which is itself the key of the key-value pair.

A key-value system (KVS), or key-value store, is a plurality of stored keys and values, with each key having an associated value to which it is mapped via a logical function or logical tree, for example a hash table or hash map. A hash table or hash map is a data structure that uses a hash function to map keys (identifying values) to their associated values. In embodiments of the present invention, a hash function may be used to transform a key into an identification of the storage node (storage resource) in the plurality of storage nodes forming the distributed network of storage nodes.

Embodiments may be provided in which the value of each of the plurality of key-value pairs includes additional information related to the triple stored within the key. As an example, meta-data about the triple is stored in the value. Meta-data in this context is descriptive data about the information items in the triple. The key stores a triple, and the value stores information about that triple.

Optionally, in such an embodiment, the additional information is data made available to an application accessing the database in dependence upon the identity of the application. Advantageously, such embodiments extend the functionality of the database by enabling an application-dependent aspect to the reading and/or writing of data in the database. The data is application-dependent data, and may be viewed and treated in the KVS as an opaque object. The value container may also include an API to set and retrieve the application-dependent data.

Optionally, in the KVS implementations described above, the additional information includes a list of applications registered to receive a notification when a read and/or write access is made to the RDF triple stored within the key-value pair. Furthermore, the additional information may include software code for execution by the node storing the container. For example, the software code may be stored and called in response to certain events, with arguments for the software code also stored in the container. For example, a value may store a block of software code as an update function. When an associated triple is updated, the update function is called, with a list of other triples and their locations as arguments. The list of other triples may have been produced by client applications adding triples to a list in the container associated with a particular event.

Advantageously, notifying applications when a read or write access is made to triple data enhances the level of interaction between the database and applications using the data stored therein. Maintaining a list of applications registered to receive notifications provides a mechanism by which the notifications can be administered.

Preferred features of the present invention will now be described, purely by way of example, with reference to the accompanying drawings, in which:—

DETAILED DESCRIPTION OF THE PREFERRED EMBODIMENTS

Figure 1:
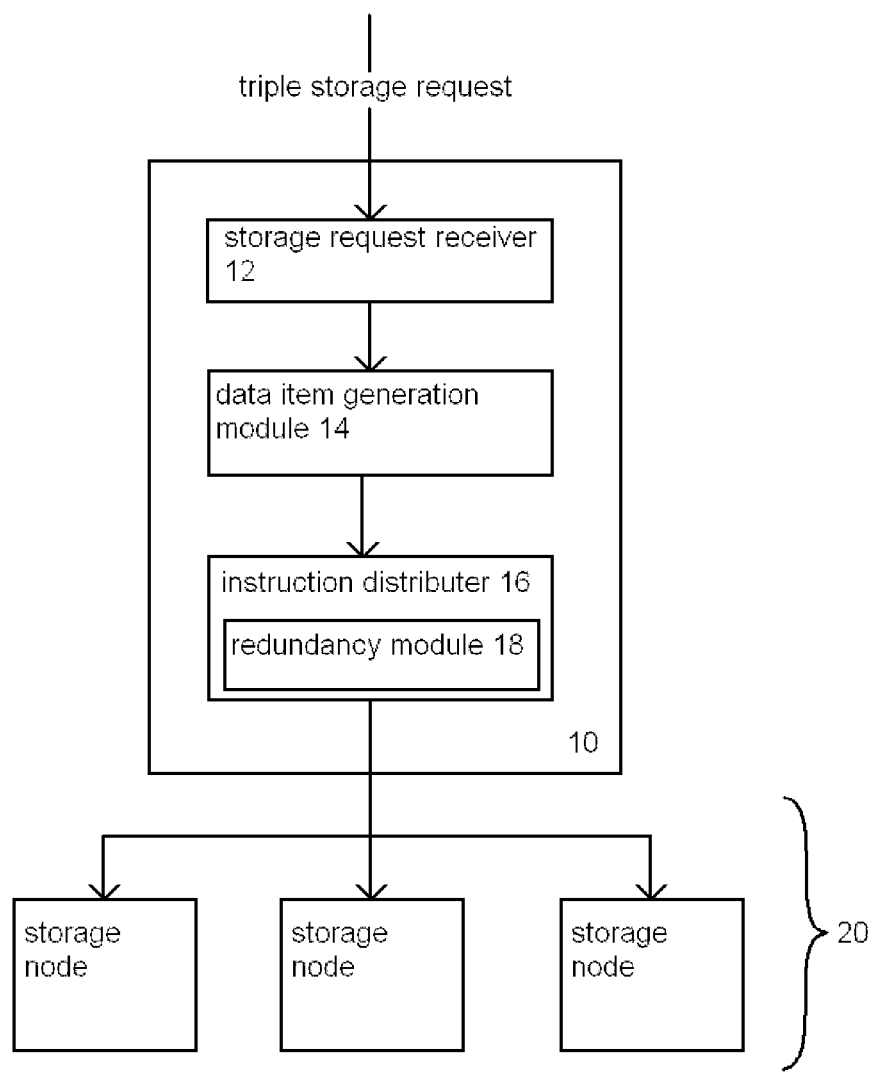
FIG. 1 is a schematic illustration of a database controller embodying the present invention.

FIG. 1 illustrates schematically a database controller embodying the present invention. The database controller 10 comprises a number of components: a storage request receiver 12, a data item generation module 14, and an instruction distributer 16 which itself includes a redundancy module 18. The components themselves may be realised by dedicated hardware, for example processors, memory, storage, and network interfaces where appropriate, all configured to function in the manner described below. Alternatively, database controller may be a function provided by a computer program running on a computing device (or by a suite of computer programs running on more than one computing device cooperatively), such as a server which may itself be a storage node in the distributed network of nodes 20. In such embodiments, the components are functional units or modules each utilising the hardware provided as part of the computing device itself to realise their described functionality.

The database controller 10 could be realised as a centralised controller on a single storage node, as a centralised controller by a number of storage nodes cooperating, or as a controller among a plurality of equivalent controllers each on a respective storage node. For example, it may be that the database controller 10 is provided by a program running on a storage node in the distributed network of nodes, and that one or more other storage nodes are also running equivalent programs so that the database is accessible via a plurality of database controllers 10.

The database controller 10 is illustrated as connected to a distributed network of storage nodes 20. The arrows originating from the instruction distributer 16 and terminating at the storage nodes are illustrated with that directionality to represent an instruction to store a data item being issued. However, it may be that the data connection between the database controller and the network of distributed storage nodes is bi-directional. In fact, in embodiments of the present invention each storage node and database controller may be able to communicate with one another via a network, whether it be wired, wireless, or some combination of the two. It may be that each of the storage nodes in the distributed network of nodes 20 has a database controller such as the database controller 10.

The storage request receiver 12 is configured to receive a request to store a triple in the database. The request may come from, for example, a client device running an application wishing to add a new triple to the database. The storage request receiver 12 may be, for example, an RDF layer or part of an RDF layer, and handles requests to add triples to the database, and possibly also to remove triples from the database and to read or query the database. Interaction between applications wishing to access the database and the database itself come via the storage request receiver 12 and may be in a form specified by an application programming interface (API) exported by the database controller 10 and/or one or more of the storage nodes in the distributed network of nodes 20. The storage request receiver 12 may be configured to perform processing to interpret the request from the application and to generate instructions for the other components of the database controller 10 based on the request. For example, the storage request receiver 12 may extract a string representing a triple forming the basis of a triple storage request and pass the extracted string (or other data representation of the triple) to the data item generation module 14.

The data item generation module 14 is configured to generate two or more data items each having a different version of the triple from among the following:
 a first version in which the subject precedes the predicate and the object in the data item;
 a second version in which the predicate precedes the subject and the object in the data item; and a third version in which the object precedes the subject and the predicate in the data item.

The order in which the remaining elements of the triple appear in each of the versions may also be predetermined. It may be that the data item generation module 14 is configured to generate three data items each having a different one of the three versions listed above. The data item generation module 14 may be an RDF layer, part of an RDF layer, or a combination of parts of an RDF layer and parts of a storage layer. The data item generation module 14 is configured to execute the processing necessary to accept a triple or a data representing a triple from the storage request receiver 12, and to produce the different versions of the triple required, and possibly also to package those different versions of the triple into data items of a specified format with or without additional data. The data item generation module 14 is configured to pass the generated data items to the instruction distributer 16.

The instruction distributer 16 is configured to, for each of the two or more data items, select a storage node from among the plurality of storage nodes 20 to instruct to store the data item, the selection being made in dependence upon the position of the data item within the ordered set, the instruction distributer 16 including a redundancy module 18 configured to ensure that at least two different storage nodes from among the plurality of storage nodes 20 are instructed to store a data item including a version of the triple. The instruction distributer 16 may be part of a storage layer, and is configured to execute the processing necessary to instruct storage nodes to store particular data items, for example, by sending a request including the data item to the storage node via the network, or by causing such a request to be sent. For example, the instruction distributer 16 (via the redundancy module 18) may be configured to map the data items to storage nodes in a deterministic way and in a way which ensures that no two versions of the same triple are stored on the same storage node. Alternatively, the instruction distributer may be responsible for mapping data items to storage nodes (for example, using a deterministic hashing function) and the redundancy module is configured to review the mapping of the data items having the two or more different versions of a particular triple, and where the mapping does not result in there being more than one storage node storing a version of the triple, generating an additional replica of a data item having the triple and instructing a storage node other than that which is instructed to store the reviewed data items to store the additional replica.

The distributed network of nodes 20 could be, for example, a distributed peer-to-peer network. Such networks are scalable and may comprise a large number of servers. In fact, the greater the level of distribution of the ordered set of data items, the easier it is for the redundancy module to ensure that the requisite number of storage nodes are instructed to store a data item including a version of the triple.

Figure 2:
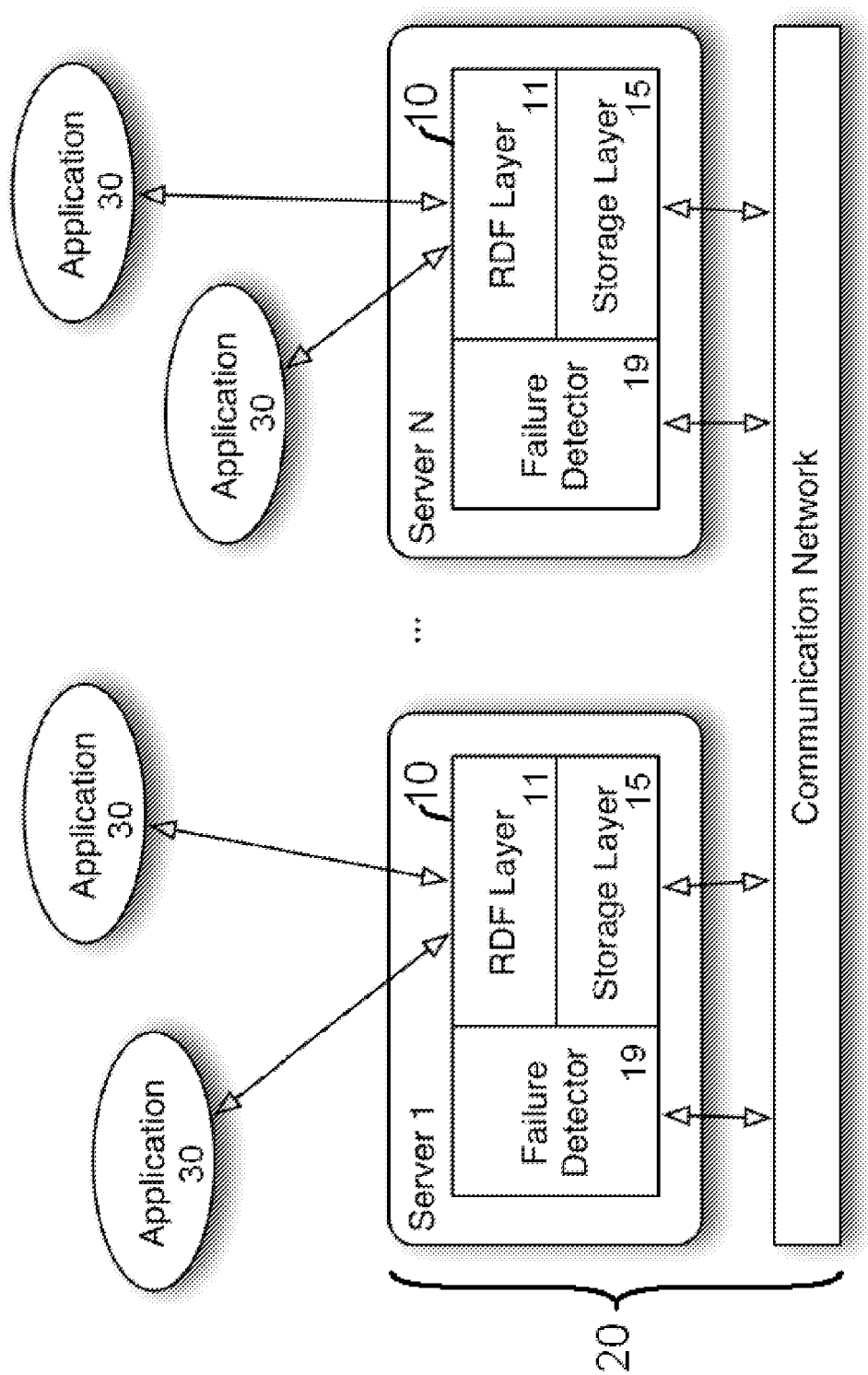
FIG. 2 is a schematic illustration of a system embodying the present invention.

FIG. 2 illustrates a system embodying the present invention. In FIG. 2, each server 1-N and application 30 is executed in a computer. All the computers are communicably connected via a network. The arrows between the different modules represent network communication, although these are intended to emphasise communications discussed hereafter, and are not restrictive of the communication between modules that is possible is such a system architecture. Applications 30 interact with one of the servers using a well-defined API, which is exported by all servers 1-N. Each server has a database controller composed by 3 software components:

RDF Layer 11—handles requests from applications to add and remove data, or to execute high-level queries over the existing data. The application requests are converted to low-level requests and forwarded to the Storage Layer. The RDF Layer 11 is responsible for converting RDF data into a simple and uniform representation of triples. High level queries must also be converted to a set of range queries. The RDF layer 11 is exemplary of a storage request receiver 12;

Storage Layer 15—the storage layer 15 is responsible for the generation and distribution of the data items and for the execution of range queries. The storage layer 15 is exemplary of the data item generation module 14, the instruction distributer 16, and the redundancy module 18;

Failure Detector 19—the failure detector 19 is responsible for the execution of watchdogs that will detect a server failure and notify the Storage Layer 15 of the remaining (not failed) servers. The Storage Layer 15 and the Failure Detector 19 communicate with the similar components on different servers using the communication network.

The database of this embodiment is provided by a storage system which is composed of a distributed set of servers (storage nodes) 20 that communicate through a network. The set of servers 20 that compose the system implement also a distributed ordered hash map. An application 30, for example, an application running on a client machine connectable to one or more of the servers 20 via the network, interacts with the system by connecting to one of the servers. The client application 30 is provided with an interface to add, remove, and query RDF data, for example, by adding new triples, removing triples, and executing range queries.

The servers 20 communicate with each other through a network and run a distributed failure detector by each running a failure detector module 19 as a component of their respective database controllers 10. When process P fails (wherein process P is used to denote the storage process realised by a server of the distributed set of servers 20), eventually the other processes will receive a notification from the failure detector indicating that P has failed. Data in the database of the embodiment is stored as triples, for example, RDF triples. RDF triples are RDF data in the form of [Subject, Predicate, Object], or simply SPO. The data are stored in such a way that range queries can be efficiently executed using replicas that store the same triple but in a different order, such as POS or OSP. In embodiments of the present invention, the replicas are also used in the data recovery process.

The data set stored in the database is ordered according to the triple data in each data item. The range of the data set is split into N segments, where N is the number of servers that will be used as storage. Each server is responsible for a segment of data. When data is added to the system, at least two (preferably three) versions of each triple are generated and those versions are stored on at least two (preferably three) different servers. A segment (and its corresponding server address or ID) is calculated for each triple version by the storage layer 15 (instruction distributer 16) using a deterministic technique such as consistent hashing. It may be that each triple version will naturally be stored on a different server, but consistent hashing cannot always guarantee this property. In cases where each triple version is not stored on a different server (or the versions are not spread across at least two different servers), extra copies of the triple are stored in data items on different servers. All the servers where a data item having a particular triple is stored can be calculated locally (for example, at each database controller 10) using a deterministic procedure. Since range queries are executed against the data that is already stored in an ordered set, the server that initiates the range query can also calculate the list of servers that need to be queried locally.

The at least two (preferably three) copies of the triple stored in different versions serve two purposes: to efficiently execute range queries, regardless of the prefix specified in the range query (i.e. ranges can be specified by subject, predicate or object and still be handled efficiently) and to recover data from failures. When a server that contains a triple in the form SPO fails, there are one or more additional copies in the system: POS and OSP. These triples contain exactly the same data, but represented in a different order. Using this information, the system embodying the present invention provides a mechanism to retrieve lost data from the different representations of the triples. The lost data is recovered and the new location of each triple is recalculated. When a server (or process) fails, the surviving servers have enough information to realize which triples need to be recovered and reshuffled. The recovery process is desirable not only to maintain the number of replicas needed to ensure tolerance to failures, but also to ensure that the data is located in the server that is deterministically reachable by all the servers in the system.

As previously outlined before, consistent hashing is a very efficient way of mapping segments of data to servers, and may be used in embodiments of the present invention by the storage layer 15 (instruction distributer 16) to select which storage node (server) to instruct to store a data item including a version of a triple. Such a hashing method may select a different server for each data item storing the same triple, but depending on the relative numbers of data items, servers, and the hashing algorithm (which, for example, requires that the relative order between data items be maintained), this is not necessarily the case. Hence embodiments of the present invention are provided with a mechanism for ensuring that the data items storing different versions of the same triple are stored in at least two (preferably three) different servers.

More specifically, the storage layer 15 (instruction distributer 16) is provided with the functionality (redundancy module 18) to handle three different scenarios to ensure that the system always has at least one copy of the triple in, for example, three different servers:

In a first scenario 3 versions of the triple (SPO, POS and OSP) are naturally stored in different servers, for example SPO is stored in server1, POS is stored in server2 and OSP is stored in server3. In this case, no further actions need to be taken.

In a second scenario, two versions of the triple are stored in the same server, and one version in another server, for example SPO and POS are stored in server1 and OSP is stored in server2. In this case, only two servers will have a version of the triple and the system will be less tolerant to failures for this particular data item. To avoid this, the database controller 10 (for example, via the redundancy module 18) carries out the processing necessary for an additional copy to be stored in a third server.

In a third scenario, all the three versions of the triple, SPO, POS and OSP, are stored in the same server (e.g. server1). In this case, the system will lose this data item if server1 fails. To ensure the same level of fault tolerance, the database controller 10 (for example, via the redundancy module 18) carries out the processing necessary for an additional copy to be stored in two different servers (different from the server already storing the existing three versions, and different from one another).

By handling the above three scenarios in the manner set out above, the system ensures that, for each triple in the database, there are at least three data items including a version of that triple stored. In the cases where data items storing the different versions of the triple are not mapped to three different servers (scenarios 2 and 3) more replicas of one of the data items are added, or new data items having a version of the triple are added. In the scenario 2, the system will have to store four data items having a version of the triple. In the scenario 3, the system will have to store five data items having a version of the triple. This is necessary because, in this particular implementation, the original data items (or triples) cannot be moved from their place in the ordered set of data items. It may be that the frequency of occurrence of scenarios 2 and 3 is relatively low compared to scenario 1, but it is dependent on the amount of data to store and the amount of available servers. Although this method for storing triples can be used in any network configuration, using a scalable peer-to-peer network with many servers will increase the probability of scenario 1 occurring and hence reduce the number of duplicates of versions of triples in the system.

In addition, this particular system includes a failure detector 19. A simple version of a failure detector is one configured to use timeouts and "ping" messages. The failure detector 19 of each server is configured to periodically send a "ping" message to each of the other servers. If, for example, server1 does not receive a "ping" message (or other type of predetermined response) from server2 after a specified amount of time, server1 will suspect that server2 has failed and execute an agreement procedure with the remaining servers to exclude server2 from a list of available servers and execute a data recovery process. This particular method for implementing a failure detector is known as "eventually perfect failure detector" and is particularly useful in a system where network messages are not lost and there is an (unknown) upper bound on message delays. Optionally, the "ping" messages can be piggybacked in regular server messages to save network bandwidth. More details and methods of implementing failure detectors can be found in the paper "Tushar Deepak Chandra and Sam Toueg. 1996. Unreliable failure detectors for reliable distributed systems. J. ACM 43, 2 (March 1996), 225-267. DOI=10.1145/226643.226647".

In the system illustrated in FIG. 2, each server has its own database controller performing equivalent roles. Each server is running a process having the following data structures:

A storage table. Each process stores a table that is composed by the following fields:
triple_data: Triple
triple_order: Enum{SPO,POS,OSP}
spo_node_ID: Integer
pos_node_ID: Integer
osp_node_ID: Integer In the storage table, the entries are ordered by the first field (triple_data) to allow local range queries on each process (for example, alphabetical ordering based on a string representing the triple). The triple_order is a number representing the order in which the triple is encoded, so that, for example, based on the number stored in triple_order, it is derivable which element of the triple is represented by, for example, the second element. In this particular implementation, the IDs of the nodes at which each of three versions of the same triple is stored at is also stored with the triple in the storage table. In an alternative implementation, the storage tables and the replica table discussed below can be integrated with the ordered Trie in such a way that we could have both the ordered triples and the searchable indexes are available to the database controllers.

Additional data structures which the processes/servers may store include the following:

An Index that maps node_IDs to pointers to rows on the storage table—for example, in the case of failure of a particular server, the node_ID of that server could be determined, and the index would enable the rows required for recovery of data on the failed server to be identified efficiently;

A replica table, used to store replicas of triple versions that are generated in order to fulfil the requirement that, for example, three different servers each store a version of the same triple. In order to maintain the ordering of the existing versions of the triples, it may be that such replicas are stored outside of the primary storage table, hence this replica table may only store triples in the SPO form, and may be composed by the following fields (wherein replica1_ID is an integer indicating the ID of the node on which a first replica of the SPO version of the triple can be found, and replica2_ID is an integer indicating the ID of the node on which a second replica of the SPO version of the triple can be found, should a second replica exist):

triple_data: Triple
spo_node_ID: Integer
pos_node_ID: Integer
osp_node_ID: Integer
replica1_ID: Integer
replica2_ID: Integer An Index that maps node_IDs to pointers to rows on the replica table—again, such an index is expedient for data recovery purposes.

In this embodiment, each Triple is stored 3 times in the distributed storage system: in the SPO order, in the OSP order, and in the POS order. This ensures that there are 3 versions of each triple stored in data items and ensures that range queries can be efficiently executed, regardless of the search type (by Subject, by Predicate or by Object). The following paragraphs describe how the triples are stored and how information is recovered when a process fails.

The data is composed by a set of Triples that are ordered through a linear data space. This data space is split in segments. To efficiently retrieve the segment where a specific data item should be placed, a mechanism such as a Trie (a sorted Tree) can be used, where each leaf of the Trie corresponds to a segment. Such a data structure is replicated among each storage node of the system and maps data items to segment IDs. Since data items are always ordered, it is possible to retrieve segment IDs needed to execute a range query. A range query retrieves all the data between t1 and t2, where t1 and t2 are data items (or triples). So, the segments (wherein segment is understood to be a portion of the total set of data that is stored on a particular storage node/server/machine) that need to be queried are: the segment where t1 is placed, the segment where t2 is placed, and all the segments between these two (between in terms of the order of the storage nodes when ordered according to the order of the segments of the ordered set of data items that they each store). After retrieving the segment IDs, a mechanism such as consistent hashing is used as a tool to map segments to machines. With this functionality, a function/method is provided that locally maps a data item (triple) to a specific machine ID:

MachineID getMachineID(Object triple)

This method maps a data item to a segment ID using the Trie structure (or other mapping of ordered data items to segment ID) and then the segment ID is mapped to a machine ID using consistent hashing (but in this second step, any mechanism that maps segment IDs to machine IDs fit the purpose). The method is called via the instruction "getMachineID" with a representation of the triple provided as an argument. A MachineID, which may be, for example, an integer, is returned. This method may be used by the storage layer 15 (instruction distributer 16) to select the storage node on which to store each version of a triple.

The machine ID identifies a specific storage node. The ID of a storage node (wherein a storage node is a machine or server) may be attributed, for example, by hashing its address and depend on its relative position in the linear space of the data. These IDs may also define an order among each other in a circular way. This means that if we have, for example, 3 machines in the system, the order relation 'A<B'(A lower than B) is defined as follows:

machine1<machine2<machine3<machine1.

In the description of the data insertion method, the operation 'machineID+1' corresponds to the next machine of the linear space. As an example:

machine1+1 is the same as machine2
machine3+1 is the same as machine1

Finally, there are two additional methods:

store(Object triple, MachineID spoID, machineID posID, MachineID ospID)
storeReplica(Object triple, MachineID spoID, machineID posID, MachineID ospID, MachineID replica1, MachineID replica2)

All storage servers provide these methods via their database controllers. These methods may be called by, for example, the instruction distributer in issuing instructions to storage nodes. The store( ) method instructs storage of a triple in the storage table of a particular server. It can be seen from the above that, in this embodiment, the arguments included when calling the method are the triple itself, the ID of the storage node on which it is to be stored, and the IDs of the storage nodes on which each version of the triple is to be stored.

The storeReplica( ) method stores a triple in the replica table of a particular server when a version of the triple is replicated, for example by the redundancy module 18, in order to ensure that the required number of storage nodes have a version of a particular triple. As optional extensions to the core functionality of invention embodiments, these methods also store the IDs of the other versions of the triple and update the indexes previously described.

The mechanism (Method addTriple) that stores the three versions of the Triple (and replicas where required) works as follows, having a representation of the triple as an argument, and is an example of the methods that are performed by the database controller 10 having received a request to store a triple in the database:

```
Method addTriple(Triple triple):
    MachineID m1, m2, m3
    m1 = getMachineID (triple.asSPO( ))
    m2 = getMachineID (triple.asPOS( ))
    m3 = getMachineID (triple.asOSP( ))
    store(triple.asSPO( ), m1, m2, m3) in m1
    store(triple.asPOS( ), m1, m2, m3) in m2
    store(triple.asOSP( ), m1, m2, m3) in m3
    if(n1 == n2 AND n1 == n3){
        // Store 2 extra replicas
        MachineID r1, r2
        r1 = n1 + 1
        r2 = n1 + 2
        storeReplica(triple.asSPO( ), m1, m2, m3,r1,r2) in r1
        storeReplica(triple.asSPO( ), m1, m2, m3,r1,r2) in r2
    }
    else if(m1 == m2 OR m1 == m3 OR m2 == m3){
        // Store an extra replica
        MachineID r1
        r1 = max(m1,m2,m3)+1
        storeReplica(triple.asSPO( ), m1, m2, m3,r1,null) in r1
    }
```

These procedures ensure that each version of a triple SPO, POS and OSP is stored in the system in such a way that allows range queries using as prefix any combination of a subset of the triple data. It may be that the hashing function used in "getmachineID" for the triple as SPO, as POS, and as OSP returns different machine IDs for all the 3 versions of the triple and hence they will all be stored in different servers. Having checked whether or not this happened, the number of required replicas is determined, and the replicas are generated and their storage instructed. Only in the case that this does not happen, one or two extra replicas are stored. These replicas are used only on the recovery process and are not used to execute range queries. The extra copies are just a fall back procedure to ensure that the system always have at least 3 copies of each procedure. In some cases, the system may store 4 or even 5 versions of the same data, but the consistent hashing algorithm ensures that this only happens in a minimal number of cases, and only when required for data redundancy purposes. In operational implementations of the invention it is likely that replicas will be required only in a very small percentage of cases.

Finally, a delete operation is issued exactly the same way, but by executing a delete( ) and deleteReplica( ) methods in the server, instead of the store( ) and storeReplica( ) respectively. These methods delete the row of each table that corresponds to the triple to be deleted. The delete( ) and deleteReplica( ) methods also update the respective indexes, if necessary.

When a server fails, the failure detector will eventually detect this event. For example, the failure detector of a particular server may detect the event by cooperating with the failure detectors or failure detector modules of other database controllers in the network. Hence, it may be considered that the failure detector is distributed among each of the servers (database controllers) in the network. Once a server failure is detected, a response will be triggered. For example, a detection of a failed server may trigger an "on Failed" event on the surviving servers (for example, on their database controllers). Once a server is notified that another server has failed, for example by receipt of an "on Failed" event notification, the server executes a recovery operation via its database controller. Assuming that FID is the ID of the failed process, the data recovery operation may be composed of the following steps at the database controller of each of the non-failed storage nodes:

1. Check in the storage index if there is any mapping from FID to table rows (on the non-failed storage node);
2. For each triple identified by the index:
a. recalculate the new machine IDs for that triple (i.e. for each data item storing a version of that triple), using the new membership configuration, for example, such an operation could be carried out at the storage layer 15 (in the instruction distributer 16), possibly by using the getMachineID method with the triple in each of three configurations SPO, POS, OSP as arguments;
b. if there are servers that stored a version of the triple and will not store in the new configuration, remove that triple from that machine, for example, such removal could be instructed by the storage layer 15 (instruction distributer 16) using the delete( )method;
c. if there are servers that will store that triple, but were not storing in the previous configuration, add the triple to the server, for example, the addition could be instructed by the storage layer 15 (instruction distributer 16) using the store( )method with arguments as required by the particular implementation, but at least including the version of the triple that is to be stored;
d. if there are servers that stored that triple in the previous configuration and continue to store in the new configuration, simply update the IDs of the triple on the table of that server, such an update could be carried out by issuing an update instruction to the appropriate server.
3. Check in the replica index if there is any mapping from FID to table rows, and repeat step 2 for those triples.

Finally, to avoid this procedure to be executed several times for the same triple, embodiments of the present invention may include a mechanism to ensure that only one of the servers that contain a replica (or version) of the triple will execute the data recovery operation. This may be achieved, for example, by calculating the lowest machineID of (non-failed) servers that store a version of the triple, whether that be a replica or otherwise. This value is simply achieved by consulting the storage and replica tables if the triples are stored with machineIDs of other nodes storing versions or replicas of the same triple. Otherwise, the IDs of the other storage nodes storing versions or replicas of the same triple could be determined in accordance with the mapping function used in selecting which nodes to instruct versions of the triple by the instruction distributer. If the server that is executing the recovery procedure is the lowest ID for that triple, it will execute the recovery procedure for that triple. Otherwise, this is simply ignored, since another server will handle the triple.

Figure 3:
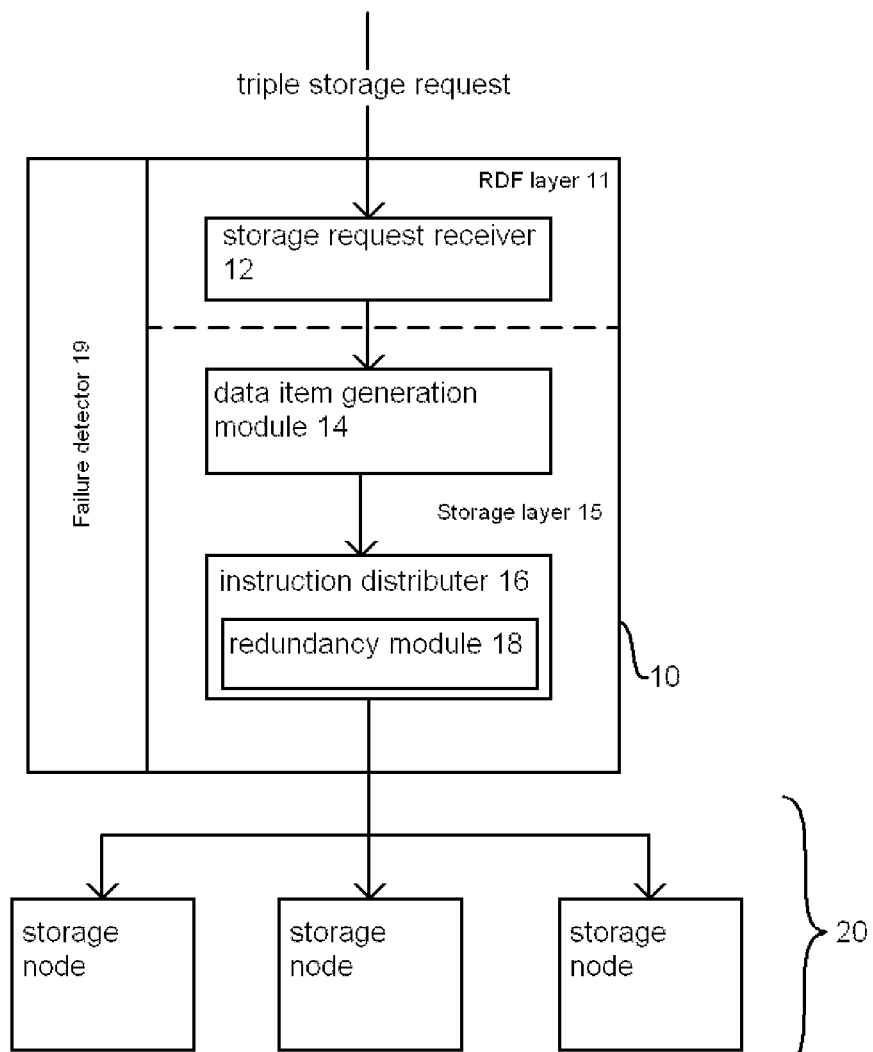
FIG. 3 illustrates an example of which of the components of the database controller of FIG. 1 correspond to which of the software layers of FIG. 2.

FIG. 3 illustrates an example of how the "layers" of FIG. 2 relate to the components of FIG. 1. Namely, the RDF layer 11 includes the storage request receiver 12, and the storage layer 15 includes the data item generation module 14, the instruction distributer 16, and the redundancy module 18. The failure detector 19 does not belong to either layer but is a component which is operable to exchange data with and issue instructions to either or both layers/components as required.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

The invention claimed is:

1. A database controller for a database, stored on a non-transitory computer readable storage medium, when executed by a computer, for storing graph data encoded as triples, each triple comprising a subject, a predicate, and an object, and each stored within a data item among a set of data items ordered according to the triple stored within, with each data item being stored on a storage node from among a plurality of storage nodes distributed in a network;
the database controller comprising:
a storage request receiver configured to receive a request to store a triple in the database;
a data item generation module configured to generate two or more data items each having a different version of the triple from among the following:
a first version in which the subject precedes the predicate and the object in the data item;
a second version in which the predicate precedes the subject and the object in the data item; and a third version in which the object precedes the subject and the predicate in the data item; and the database controller further comprises:

an instruction distributer configured to, for each of the two or more data items, select a storage node from among the plurality of storage nodes to instruct to store the data item, the selection being made in dependence upon the position of the data item within the ordered set, the instruction distributer including a redundancy module configured to ensure that at least two different storage nodes from among the plurality of storage nodes are instructed to store a data item including a version of the triple;

wherein the instruction distributer is configured to select a storage node from among the plurality of storage nodes to instruct to store the data item in a deterministic fashion, and the redundancy module is configured to, following the selection of storage nodes for the two or more data items, obtain a count of the number of different storage nodes from among the storage nodes selected to store the two or more data items, and if the count is less than the number of different storage nodes that the redundancy module is configured to ensure are instructed to store a data item including a version of the triple, then the redundancy module is configured to instruct a number, equal to the difference between the count and the number of different storage nodes that the redundancy module is configured to ensure are instructed to store a data item including a version of the triple, of additional storage nodes from among the plurality of storage nodes to store a further data item including a version of the triple.

2. A database controller according to claim 1, wherein the data item generation module is configured to generate three data items each having a different version of the triple from among the first version, the second version, and the third version.

3. A database controller according to claim 1, wherein the redundancy module is configured to ensure that the at least two different storage nodes are each instructed to store a data item including a different version of the triple.

4. A database controller according to claim 1, wherein there are three or more storage nodes in the plurality of storage nodes, and the redundancy module is configured to ensure that three different storage nodes from among the plurality of storage nodes are each instructed to store a data item including a version of the triple.

5. A database controller according to claim 1, wherein each of the data items includes a string object comprising the subject, the predicate, and the object of the triple being stored therein; and the data items are ordered according to alphabetical comparisons of the string objects.

6. A database controller according to claim 1, wherein the instruction distributer is configured to select a storage node from among the plurality of storage nodes to instruct to store the data item by using an ordered hash table, and the ordered hash table uses a consistent hashing function.

7. A database controller according to claim 1, wherein each of the two or more data items storing a different version of the same triple also include data identifying the storage node on which each of the other data items storing different versions of that triple are stored.

8. A database controller according to claim 1, wherein the database controller further comprises:

a failure detector configured to detect when a storage node in the distributed network of storage nodes has failed and to identify the triples stored within data items stored on the failed storage node;

wherein the database controller is configured to perform the generating at the data item generation module and the selecting at the instruction distributer for each of the identified triples, with the failed storage node being excluded from the plurality of storage nodes from among which the storage nodes are selected, and the instruction distributer is configured to instruct the selected storage nodes to store data items having a version of the identified triple, and to instruct removal of any data items having a version of the identified triple stored by storage nodes prior to the failure which are not now selected.

9. A database controller according to claim 1, wherein the further data items stored by the additional storage nodes are stored outside of the ordered set of data items.

10. A method for storing graph data encoded as triples in a database, each triple comprising a subject, a predicate, and an object, and each stored within a data item among a set of data items ordered according to the triple stored within, with each data item being stored on a storage node from among a plurality of storage nodes distributed in a network;

the method comprising:

receiving a request to store a triple in the database;

generating two or more data items each having a different version of the triple from among the following:

a first version in which the subject precedes the predicate and the object in the data item;

a second version in which the predicate precedes the subject and the object in the data item; and a third version in which the object precedes the subject and the predicate in the data item; and the method further comprises:

for each of the two or more data items, selecting a storage node from among the plurality of storage nodes to instruct to store the data item, the selection being made in dependence upon the position of the data item within the ordered set, and ensuring that at least two different storage nodes from among the plurality of storage nodes are instructed to store a data item including a version of the triple, including selecting a storage node from among the plurality of storage nodes to instruct to store the data item in a deterministic fashion, following the selection of storage nodes for the two or more data items, obtaining a count of the number of different storage nodes from among the storage nodes selected to store the two or more data items, and if the count is less than the number of different storage nodes that are ensured to be instructed to store a data item including a version of the triple, then instructing a number, equal to the difference between the count and the number of different storage nodes that are ensured to be instructed to store a data item including a version of the triple, of additional storage nodes from among the plurality of storage nodes to store a further data item including a version of the triple.

* * * * *